March 12, 1957  F. E. GARRIOTT  2,785,094
COATED COPPER ALLOY ARC WELDING ELECTRODE
Filed March 5, 1953

INVENTOR.
FRANCIS E GARRIOTT
BY
Andrus & Scales
Attorneys

2,785,094
COATED COPPER ALLOY ARC WELDING ELECTRODE

Francis Emery Garriott, West Allis, Wis., assignor to Ampco Metal, Inc., Milwaukee, Wis., a corporation of Wisconsin Application March 5, 1953, Serial No. 340,509

10 Claims. (Cl. 117—206)

This invention relates to covered metal arc welding electrodes and more particularly to the coverings for electrodes of bronze, such as, the aluminum bronzes and beryllium coppers.

The particular coverings of the invention have been applied to various grades of aluminum bronzes with high and low aluminum and iron contents, the iron-free aluminum bronze compositions, as well as aluminum bronzes containing nickel as a secondary hardener and beryllium-copper alloys containing both cobalt and nickel as grain refining elements.

Copper-base alloy electrodes of the alloys referred to, which have been known to the prior art, have had many disadvantages. For example, such electrodes could not be used for alternating current welding but were limited for use only with reverse (positive) polarity, direct current. The former coatings for such electrodes were of the lightweight, dipped type producing poor arc characteristics and high spatter loss. The electrodes, due to their highly fluid slag, could not be used in all positions. The coating crater at the arcing end, as the electrode is being consumed, was of low melting point, and burned irregularly, thereby making deposition difficult to control.

The present invention relates to a covering for aluminum-bronze and beryllium-copper electrodes for metal arc welding and is an improvement over existing metal arc welding electrodes of such alloys for alternating and direct current welding of copper, iron and nickel base metals.

The covering embodying this invention provides an electrode with a soft arc resulting in a uniform spray transfer of the metal across the arc and materially reducing the amount of spatter loss as compared to a globular transfer usually attributed to copper-base alloy electrodes.

The principal object of this invention is to provide a universal, metal arc welding electrode of the alloys referred to capable of use with either alternating current or direct current welding.

Another object is to provide a metal arc welding electrode of copper alloy that can be used in all positions: vertical, overhead and downhand, in both single and multiple bead welding.

A further object is to provide a copper-base alloy electrode that will successfully weld copper, iron and nickel-base metals and dissimilar metals.

Another object of the invention is to provide a covering that may be used successfully in combination with aluminum-copper, aluminum-iron-copper-base alloys, aluminum-nickel-copper-base alloys, beryllium-nickel-copper alloy and beryllium-cobalt-copper alloys for metal arc welding.

Another object of the invention is to provide an electrode of the alloys referred to having improved arc action.

Another object is to provide a covering producing a slag and weld metal with improved flowing characteristics producing a deposit of smooth surface contour, feather edging properly into the base plate or plates with a minimum of surface pitting and undercutting in all positions.

A further object is to provide a covering giving maximum protection to the metal transferring across the arc from contamination by the atmosphere and effecting proper fluxing and deoxidation of the molten metal in the weld pool which results in sound, strong, ductile welds having maximum physical properties for the particular copper-base alloy core wire used.

Another object of the invention is to provide a flux covering for copper-alloy arc welding electrodes which will be substantially insensible to variations in core wire composition.

Another object is to provide a covering which is comparatively insensitive to variations in coating thickness and welding current.

Another object is to provide a covering of appreciable thickness that can be varied through minor adjustments for application to the core wires by either the dipping or extrusion processes.

A further object is to provide a covering that will produce a friable slag that is easily removed with ordinary hand tools.

Another object is to provide a covering of the proper melting point for the copper-base alloys given, and that will be consumed evenly and uniformly, leaving a cupped coating crater at the arc end during welding.

Other objects and advantages of the invention will appear from the following more detailed description.

Figure 1:
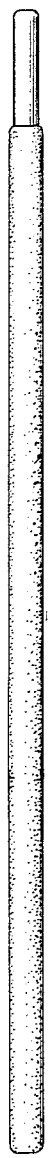
Figure 1 is a side elevation of a weld rod embodying the present invention.
Figure 2:
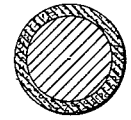
Fig. 2 is a transverse section of the weld rod of Figure 1.

Referring to the drawing there is shown a copper-base electrode 1, composed of an alloy such as aluminum-bronze or beryllium-copper, and which is coated with the flux composition 2 of the present invention.

The invention is based on the discovery that an improved aluminum-bronze and beryllium-copper electrode covering composition 2 can be attained by combining low melting point fluorides, including a substantial proportion of barium fluoride, and certain potassium compounds such as potassium silicate or feldspar. The resulting covering is capable of being used with either alternating or direct current and exhibits greatly improved welding and arcing properties.

In addition to the above-mentioned compounds, the covering may also include one or more of the following compounds depending on the composition of the electrode and the particular welding operation: a ferro-alloy, such as ferro-silicon or ferro-phosphorous; a carbonaceous material, such as cellulose or carbon; a silicate binder; and an organic binder, such as an invert sugar.

In general, the covering composition may contain the several ingredients within the following ranges:

| Ingredients: | Parts by weight |
|---|---|
| Potassium silicate (42° Baumé) | 40–95 |
| Sodium silicate | 55–0 |
| Sodium fluoride | 0–75 |
| Cryolite | 110–50 |
| Barium fluoride | 115–75 |
| Invert sugar | 0–6 |
| Alpha flock (cellulose) | 0–5 |
| Carbon (petroleum coke) | 0–50 |
| Feldspar | 0–30 |
| Ferrosilicon | 0–30 |
| Ferrophosphorus | 0–10 |

A specific example of the flux coating illustrating the invention follows:

| Ingredients | Parts by Weight | Percent by Weight |
|---|---|---|
| Potassium Silicate (42° Baumé) | 40 | 11.8 |
| Sodium Silicate | 30 | 8.8 |
| Sodium Fluoride | 10 | 2.9 |
| Barium Fluoride | 90 | 26.4 |
| Cryolite | 100 | 29.5 |
| Invert Sugar | 4 | 1.2 |
| Ferro Silicon | 5 | 1.5 |
| Ferro Phosphorus | 10 | 2.9 |
| Feldspar | 20 | 5.9 |
| Carbon (Petroleum Coke) | 30 | 8.8 |
| Alpha Flock (Cellulose) | 1 | 0.3 |

Numerous modifications of the above preferred covering within the ranges shown have been made producing satisfactory results using the dipping process.

The powdered (dry) ingredients are thoroughly mixed together and the wet ingredients are added to make a slurry to be used for the dipping process or a pulp for use in the extrusion process. The formula can be readily adjusted by additions of water to obtain the proper consistency for dipping. For the extrusion process, feldspar may be substituted for a part of the wet potassium silicate; dry sodium silicate may be substituted for a part of the wet sodium silicate; and alpha flock may be substituted for a part of the Mordex, adjusting the wet and dry ingredients so that the final chemical composition of the coating will be identical and the consistency of the pulp will be correct for extrusion.

The potassium silicate used is the 42° Baumé grade having a nominal ratio of $K_2O$ to $SiO_2$ of 1:2.10. By actual analysis, the $K_2O$ content was 12.60%; $SiO_2$ was 26.8%; and the water content was 60.5%. The actual Baumé reading was 40.75. Potassium silicates with $K_2O$ to $SiO_2$ ratios of 1:2.50 and 29° and 32° Baumé were generally unsatisfactory for use in the above covering because sodium fluoride reacted chemically with this mixture causing a "freezing" or "setting-up" of the coating mix making application to the rod impossible. The potassium silicate should have a 1:2.10 $K_2O$ to $SiO_2$ ratio.

The potassium silicate is used as the binder in the covering. It is also a slag forming ingredient and in combination with the other coating ingredients aids in adjusting the surface tension and viscosity of the slag. Generally silicates tend to increase slag surface tension and viscosity. If the silica content of the slag is too high, the resultant deposit or bead will have a high contour with surface pits.

The primary function of the potassium silicate other than its binding properties is that it aids materially in producing good alternating current arc characteristics. The $K_2O$ content of the coating should be high in order for the electrode arc to strike and be maintained satisfactorily on alternating current. The potassium silicate also aids in adjusting the melting point of the coating to produce an even burn-off of the coating at the arcing end during welding. It also reduces spatter and aids in producing the soft spray-type arc action on both alternating and direct current welding. Silicates also aid in producing a friable slag that can be removed easily.

Sodium silicate may also be used as a binder in the covering. In addition, to adjust the coating consistency for the extrusion process, feldspar or muscovite mica may be substituted for a part of the potassium silicate.

The low melting point fluorides such as sodium fluoride, barium fluoride, calcium fluoride and cryolite are necessary as fluxes in the coating to remove the oxides of aluminum, copper, iron and beryllium from the molten metal in the weld puddle or pool to the slag, thereby cleansing the metal during the remelting process and until solidification of the molten metal occurs. In combination with the silicates, they are also necessary to adjust the surface tension and viscosity of the slag properly. In general, fluorides produce slags of low surface tension and viscosity. Fluoride slags without the presence of silicates are very fluid and would be impossible to control in vertical and overhead welding.

Copper-base alloys have relatively low melting points, making a low melting point coating desirable. Therefore, lower melting point fluorides are employed to control and adjust the electrode coating melting point.

The barium fluoride is essential to the success of the electrode operation on alternating current since this ingredient has high thermionic emission which aids in striking and maintaining the arc. The arc is otherwise unstable unless excessive quantities of potassium silicates are added and this addition would adversely affect the bead contour of the deposited metal.

The invert sugar serves as an additional binder producing a more even burn-off of the coating at the arcing end during welding. The invert sugar is an organic material, decomposing in the arc to produce a reducing gaseous shield around the molten metal in transfer across the arc, thereby protecting the metal from contamination by undesirable constituents in the surrounding atmosphere. Additions of the invert sugar also improve the arc characteristics of the electrode, producing a more steady arc and transfer of the metal. The alpha flock or cellulose and canary dextrin have similar characteristics to the invert sugar as well as acting as diluent materials in the coating. The alpha flock, canary dextrin and the invert sugar may be substituted or interchanged one for the other in the coating depending upon the method of manufacture. Generally, for a dipped coating the alpha flock content cannot be greatly in excess of the amounts shown in the preferred composition. However, in extruded coatings, the alpha flock content should be increased and the invert sugar or canary dextrin content decreased. For dipped coatings, 200 mesh alpha flock is preferred. In the extruded coating 40 mesh and preferably not in excess of 100 mesh alpha flock is preferred.

Powdered carbon is used as a diluent material in the coating and to facilitate air drying during manufacture. It also aids in producing a softer arc action and serves to form a gaseous shield around the molten metal in transfer across the arc. Petroleum coke is the preferred type for dipped coatings. However, other forms, such as graphite and cliff char may be substituted with equal success depending upon the manufacturing process. In some instances, alpha flock or the invert sugar may be substituted for portions of carbon.

For aluminum bronze rods ferro-silicon and/or ferro-phosphorus are more effective deoxidizers than carbon and greatly improves the characteristics of the rod in welding. Where substantial amounts of ferro-silicon and/or or ferro-phosphorus are employed carbon may be left out.

Feldspar is a potassium aluminum silicate used as a slag forming ingredient to adjust the coating melting point and slag surface tension, and viscosity and the fairly high potassium content aids in striking and maintaining the arc on alternating current. Muscovite mica, which is also a potassium aluminum silicate may be substituted effectively for a part of the feldspar as a slipping agent in the extruded coating and to raise the coating melting point to produce a more even burn-off of the coating at the arcing end.

Lepidolite mica is a complex potassium fluorosilicate containing oxides of lithium and rubidium. Like feldspar and muscovite mica this material in the coating aids appreciably in striking and maintaining the arc on alternating current. It is also a slag forming ingredient used to adjust the melting point of the coating and the resultant viscosity and surface tension of the slag. It may be substituted for feldspar in the coating.

In order to readjust the covering melting points, pollucite, silica, marble and fluorspar have been added to the general covering formula successfully in small quantities.

Also, in some instances ferro-chrome has been added for deoxidizing purposes.

The amount of covering applied to the core wires ranges from 5.0% to 22.0% of the finished covered rod weight. Generally, the lower covering weights are applied to the larger diameter electrodes and the higher covering weights are applied to the smaller diameter rods. Core or base wire compositions to which the covering has been applied satisfactorily are set forth as follows:

|  | 1 | 2 | 3 | 4 | 5 | 6 | 7 | 8 | 9 |
|---|---|---|---|---|---|---|---|---|---|
| Copper | 89.08 | 84.52 | 83.11 | 80.95 | 80.41 | Bal. | 96.15 | 97.32 | 92.0 |
| Aluminum | 9.85 | 11.32 | 12.48 | 13.90 | 14.69 | 9.7–10.9 | | | 7.5 |
| Iron | 0.98 | 3.83 | 4.02 | 4.74 | 4.47 | 2.0– 3.5 | 0.06 | 0.11 | |
| Nickel | 0.06 | 0.33 | 0.38 | 0.40 | 0.40 | 4.5– 5.5 | 1.01 | Trace | |
| Silicon | 0.01 | 0.01 | 0.01 | 0.01 | 0.01 | | | 0.11 | |
| Beryllium | | | | | | | 2.73 | 2.16 | |
| Cobalt | | | | | | | 0.01 | 0.18 | |
| Manganese | | | | | | 1.5 Max. | Trace | 0.03 | |
| Others | Bal. | Bal. | Bal. | Bal. | Bal. | 0.5 Max. | Bal. | Bal. | 0.5 |

Various compositions of core wire may be employed to advantage with the covering.

Various embodiments of the invention may be employed within the scope of the following claims.

I claim:

1. A copper-base alloy metal arc welding electrode comprising a core wire of a composition selected from the group consisting of aluminum-bronze alloys and beryllium-copper alloys, and a covering thereon facilitating the deposit of sound weld metal therefrom by the metal arc method with both alternating and direct current welding and of a composition comprising a mixture of fluorides selected from the group consisting of alkaline earth metal fluorides and sodium fluoride and including a substinal proportion of barium fluoride, a potassium compound selected from the group consisting of potassium silicate and feldspar, and a silicate binder with the potassium compound constituting at least a part of the binder.

2. A copper-base alloy metal arc welding electrode comprising a core wire of a composition selected from the group consisting of aluminum-bronze alloys and beryllium-copper alloys, and a covering thereon facilitating the deposit of sound weld metal therefrom by the metal arc method with both alternating and direct current welding and of a composition comprising a mixture of alkaline earth metal fluorides including a substantial proportion of barium fluoride, and a silicate consisting principally of a potassium compound selected from the group consisting of potassium silicate and feldspar and adjusted in amount with said fluorides to give a slag of good surface tension and viscosity.

3. A copper-base alloy metal arc welding electrode comprising a core wire of a composition selected from the group consisting of aluminum-bronze alloys and beryllium-copper alloys, and a covering thereon facilitating the deposit of sound weld metal therefrom by the metal arc method and of a composition comprising potassium silicate and alkaline earth metal fluorides adjusted in amount to provide a slag having a good surface tension and viscosity, said fluorides including a substantial amount of barium fluoride; carbonaceous material for protecting the metal in its passage through the arc, and a ferroalloy selected from the group consisting of ferrosilicon and ferrophosphorus.

4. A copper-base alloy metal arc welding electrode comprising a core wire of a composition selected from the group consisting of aluminum-bronze alloys and beryllium-copper alloys, and a covering thereon facilitating the deposit of sound weld metal therefrom by the metal arc method with both alternating and direct current welding and of a composition comprising a potassium silicate compound having a high potassium oxide to silica ratio, barium fluoride and cryolite adjusted in quantity to said potassium silicate compound to produce a slag of proper surface tension and viscosity, and a silicate binder, said potassium silicate compound constituting at least a part of said binder.

5. A copper-base alloy metal arc welding electrode comprising a core wire of a general composition selected from the group consisting of aluminum-bronze alloys and beryllium-copper alloys, and a covering thereon facilitating the deposit of sound weld metal therefrom by the metal arc method with both alternating and direct current welding and of a composition comprising a potassium silicate compound having a high potassium oxide to silica ratio, barium fluoride, sodium fluoride and cryolite adjusted in quantity to said potassium silicate compound to produce a slag of proper surface tension and viscosity, a silicate binder with said potassium silicate compound constituting at least a part of said binder, and a ferro-alloy selected from the group comprising ferrosilicon and ferrophosphorus to dioxide the weld deposit.

6. An arc welding electrode comprising, a core wire formed of a material selected from the group consisting of aluminum-bronze alloys and beryllium-copper alloys, and a covering for said core wire comprising, potassium silicate, a mixture of alkaline earth metal fluorides including a substantial proportion of barium fluoride and adjusted in amount with said potassium silicate to provide a slag of physical characteristics compatible with the alloy, and organic ingredients selected from the group consisting of invert sugar, alpha flock, cellulose and canary dextrin to prevent contamination of the weld metal and improve the arcing characteristics of the electrode.

7. An arc welding electrode comprising, a core wire formed of a material selected from the group consisting of aluminum-bronze alloys and beryllium-copper alloys, and a covering for said core wire comprising, potassium silicate, a mixture of alkaline earth metal fluorides including a substantial proportion of barium fluoride and adjusted in amount with said potassium silicate to provide a slag of physical characteristics compatible with the alloy, organic ingredients to prevent contamination of the weld metal from the atmosphere and to improve the arcing characteristic of the electrode, and a ferro alloy in sufficient amount to deoxide the melt.

8. A copper-base alloy metal arc welding electrode comprising a core wire of a composition selected from the group consisitng of aluminum-bronze alloys and beryllium-copper alloys, and a covering thereon facilitating the deposit of sound weld metal therefrom by the metal arc method with both alternating and direct current welding and of a composiiton comprising a potassium silicate compound having a high potassium oxide to silica ratio, a mixture of alkaline earth metal fluorides including a substantial proportion of barium fluoride to produce a slag of physical characteristics compatible with the alloy, a silicate binder with the potassium silicate compound constituting at least a part of said binder, carbon in sufficient amount to improve the drying characteristics of the covering and stabilize the arc, and organic material in sufficient amount to prevent contamination of the weld metal by the atmosphere and to improve the arcing characteristics of the electrode.

9. A copper-base alloy metal arc welding electrode comprising a core wire of a composition selected from the group consisting of aluminum-bronze alloys and beryllium-copper alloys, and a covering thereon facilitating the deposit of sound weld metal therefrom by the metal arc method with both alternating and direct current welding and of a composition comprising a potassium silicate compound having a high potassium oxide to silica ratio, a mixture of alkaline earth metal fluorides including a substantial proportion of barium fluoride to produce a slag of physical characteristics compatible with the alloy, a silicate binder containing at least some potassium silicate, carbon in sufficient amount to improve the drying characteristics of the covering and stabilize the arc, organic material in sufficient amount to prevent contamination of the weld metal by the atmosphere and to improve the arcing characteristics of the electrode, and a ferroalloy selected from the group of ferrosilicon and ferrophosphorous to deoxide the melt.

10. A copper-base alloy metal arc welding electrode comprising a core wire of a composition selected from the group consisting of aluminum-bronze alloys and beryllium-copper alloys, and a covering thereon facilitating the deposit of sound weld metal therefrom by the metal arc method with both alternating and direct current welding and of a composition comprising the following ingredients substantially in the proportions given in percentages by weight:

| Ingredient | % |
|---|---|
| Potassium silicate | 11.8 |
| Sodium silicate | 8.8 |
| Sodium fluoride | 2.9 |
| Barium fluoride | 26.4 |
| Cryolite | 29.5 |
| Invert sugar | 1.2 |
| Ferrosilicon | 1.5 |
| Ferrophosphorus | 2.9 |
| Feldspar | 5.9 |
| Carbon | 8.8 |
| Alpha flock | 0.3 |

References Cited in the file of this patent

UNITED STATES PATENTS

| | | |
|---|---|---|
| 1,875,911 | Andrews | Sept. 6, 1932 |
| 2,238,392 | Matush | Apr. 15, 1941 |
| 2,435,198 | Browne | Feb. 3, 1948 |
| 2,440,941 | Garriott | May 4, 1948 |
| 2,463,096 | Garriott | Mar. 1, 1949 |
| 2,514,386 | Gayley | July 11, 1950 |